(12) United States Patent
Vedral

(10) Patent No.: US 8,331,870 B2
(45) Date of Patent: Dec. 11, 2012

(54) METHOD FOR IDENTIFYING NOISE SOURCES FOR AUTOMATION DEVICES, AND NOISE SOURCE IDENTIFICATION UNIT THEREFORE

(75) Inventor: Andreas Vedral, Castrop-Rauxel (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 621 days.

(21) Appl. No.: 12/265,400

(22) Filed: Nov. 5, 2008

(65) Prior Publication Data

US 2009/0129453 A1 May 21, 2009

(30) Foreign Application Priority Data

Nov. 14, 2007 (DE) .......................... 10 2007 054 678

(51) Int. Cl.
*H04B 17/00* (2006.01)

(52) U.S. Cl. .................. 455/67.13; 455/67.1; 455/226.1; 455/114.2; 455/115.1; 455/67.11; 710/305; 710/311; 710/312; 710/300

(58) Field of Classification Search ............... 455/67.11, 455/63.1, 67.13, 62, 452.2, 114.2, 226.1, 455/115.1; 375/227; 710/300, 305, 311, 710/312
See application file for complete search history.

(56) References Cited

U.S. PATENT DOCUMENTS

| | | | |
|---|---|---|---|
| 5,716,241 A * | 2/1998 | Hennemann et al. | 439/716 |
| 7,152,025 B2 * | 12/2006 | Lusky et al. | 703/18 |
| 7,454,222 B2 * | 11/2008 | Huang et al. | 455/522 |
| 2002/0072845 A1 * | 6/2002 | Eichenseher et al. | 701/107 |
| 2002/0086641 A1 * | 7/2002 | Howard | 455/67.1 |
| 2008/0274702 A1 * | 11/2008 | Keller | 455/67.13 |

FOREIGN PATENT DOCUMENTS

| | | |
|---|---|---|
| DE | 195 11 655 A1 | 3/1995 |
| DE | 199 49 387 A1 | 10/1999 |
| DE | 200 13 439 U1 | 8/2000 |
| DE | 20 2005 014 510 U1 | 1/2006 |
| DE | 10 2006 009 979 A1 | 6/2007 |
| EP | 1 449 397 B1 | 6/2005 |
| EP | 1 622 224 A1 | 7/2005 |
| EP | 1 717 997 A1 | 11/2006 |

* cited by examiner

*Primary Examiner* — Matthew Anderson
*Assistant Examiner* — Ganiyu A Hanidu
(74) *Attorney, Agent, or Firm* — Witham Curtis Christofferson & Cook, PC

(57) ABSTRACT

A method for identifying noise sources for automation devices (1, 2) which have a multiplicity of input/output modules (2a, 2b, . . . 2n) which are coupled to one another by means of a data bus (3, 5) and at least one of which is set up as a radio input/output module (6) for radio data communication, wherein the at least one radio input/output module (6) repeatedly checks the availability of transmission channels for radio data transmission on a continual basis and stores the availability of a sequence of transmission channels in a channel list (CL), has the following steps:

the availability of channels which is currently stored in the channel lists (CL) of the at least one radio input/output module (6) being read, the availability of the sequence of channels being compared with a number of noise source channel patterns (CP) which are stored for a number of different noise sources, and a noise source being identified if the channel pattern (CL) defined by the availability of the sequence of channels has a prescribed minimum similarity with one of the stored noise source channel patterns (CP).

10 Claims, 3 Drawing Sheets

METHOD FOR IDENTIFYING NOISE SOURCES FOR AUTOMATION DEVICES, AND NOISE SOURCE IDENTIFICATION UNIT THEREFORE

The invention relates to a method for identifying noise sources for automation devices which have a multiplicity of input/output modules which are coupled to one another by means of a data bus and at least one of which is set up as a radio input/output module for radio data communication, wherein the at least one radio input/output module repeatedly checks the availability of transmission channels for radio data transmission on a continual basis and stores the availability of a sequence of transmission channels in a channel list.

The invention also relates to a noise source identification unit having a comparison unit, a data store and a data bus communication unit which is set up for data communication with radio input/output modules of an automation device by means of a data bus.

Conventional automation devices in which a multiplicity of input/output modules are coupled to one another by means of a field bus often also contain radio input/output modules for radio data communication. These industrial radio solutions, described by way of example in DE 10 2006 009 979 A1, are very often based on standard technologies from the consumer domain. Classical standard technologies are IEEE 802.15.1 (Bluetooth) and IEEE 802.11 (WLAN) and also other proprietary technologies, which operate in respective frequency ranges, such as particularly in the 2.4 GHz ISM frequency band. Accordingly, it may occur that the radio systems interfere with one another if they communicate at a short distance from one another. In industrial automation devices, radio data communication is problematical particularly because WLAN radio networks can often be set up parallel thereto and also modular consumer appliances, such as PDAs, notebooks etc., mobile telephones etc., have incorporated radio technologies with the 2.45 GHz ISM frequency band. To operate an industrial automation device with radio input/output modules, it is necessary to ask the question of whether parallel operation of different radio solutions in the same frequency range is possible without reducing the reliability of transmission. This can be ensured, by way of example, through the exclusive use of portions of the ISM frequency band by the one respective radio network. For the user of industrial radio solutions, it is therefore of great importance to obtain knowledge about the information provided for the frequency spectrum. This means that it is firstly possible for interfering influences to be identified and it is secondly possible to avoid unconsciously interfering with coexisting radio solutions. As early as during the installation phase for industrial radio solutions, it is therefore necessary to identify potential noise sources in good time in order to be able to react thereto with adequate measures. Such measures may be setting a different frequency channel, altering the installation position of sender and receiver or using antennas with directional actions, for example.

EP 1 449 397 B1 discloses a method for noise measurements on wireless communication systems which involves monitoring whether a carrier is free. The aim is to prevent different radio systems from interfering with one another by using interference measurement to replace a channel with a less noisy one. Channels disturbed by interference are detected by continuous or quasi-continuous interference measurement.

EP 1 717 997 A1 discloses a method for reducing interference in local area radio networks by other appliances in the same frequency band. Channels in the Bluetooth network which are disturbed by interference are excluded from the data traffic and the remaining channels are split over a plurality of Bluetooth networks by channel control. Interference is identified using a channel measurement unit, which detects interference and transmits interference information to a channel controller.

It is therefore an object of the present invention to provide a method which can be used to identify noise sources for automation devices with the lowest possible additional complexity by utilizing the functionalities noise sources which are present in the automation devices anyway.

The object is achieved with the method cited at the outset by virtue of
  the availability of channels which is currently stored in the channel lists of the at least one radio input/output module being read,
  the availability of the sequence of channels being compared with a number of noise source channel patterns which are stored for a number of different noise sources, and
  a noise source being identified if the channel pattern defined by the availability of the sequence of channels has a prescribed minimum similarity with one of the stored noise source channel patterns.

It is therefore proposed that the information about the availability, contained in channel lists, of channels in at least one frequency band of interest, which information is available in radio input/output modules anyway, be used by reading the availability of a sequence of transmission channels from radio input/output modules which are networked to one another in an automation device by means of a data bus. The information contained in the at least one read channel list is then evaluated by performing a comparison with characteristic noise source channel patterns for known noise sources. As soon as a prescribed minimum similarity is reached between the channel pattern specified in the read channel list and one of the stored noise source channel patterns, it is possible to infer the noise source associated with the similar noise source channel pattern.

The method makes use of the fact that standard technologies for radio data communication normally perform availability measurement for channels anyway in order to carry out data transmission in a defined frequency band only in the available, noise-free channels. Thus, by way of example, Bluetooth technology reduces interference from other active noise sources in the 2.45 GHz ISM frequency band by using what is known as the "Slow Frequency Hopping Spread Spectrum" (SFHSS) method. This involves the 2.45 GHz ISM frequency band being split into 79 logical channels with a bandwidth of 1 MHz. A respective data packet is transmitted by using one logical channel exclusively. Thereafter, another channel from the 79 possible channels is calculated on a pseudo-random basis and is used for transmitting the next data packet. To this extent, the probability of data packet collisions occurring between coexisting radio solutions, or of other active noise sources interfering, is reduced.

From specification V1.2 onwards, Bluetooth technology has an adaptive frequency hopping method in which the logical channels are rated using spectral noise powers in the 2.45 GHz ISM frequency band during the active data interchange. If interference is identified in one or more of the 79 channels, the Bluetooth system excludes the at least one noisy channel from the frequency hopping sequence. The communication is then continued on the remaining channels. The current status of the available channels can be requested from the Bluetooth transceiver using the standardized "Host Controller Interface" (HCI). This can be done using the HCI command "Read_AFH_Channel_Map", which can indicate the existence of channel interference in the form of a bit mask. A binary "0" at a bit position signals a (unusable) channel which is currently subject to active interfering influences and has been hidden for communication. By contrast, a binary "1" indicates that the channel is noise-free.

A bit mask of this kind for the 79 channels in the 2.45 GHz ISM frequency band can therefore be used as a channel list by not only hiding individual channels for data communication, as is known from Bluetooth technology. Rather, the bit masks (channel lists) have characteristic bit patterns when noise sources are present, said bit patterns being evaluated to identify noise sources, in line with the teaching of the present invention.

It is therefore possible not only to identify active noise sources but also to infer the type of the noise sources. Since known noise source type channel patterns are stored for this purpose, it is possible to infer a noise source type associated with the noise source channel pattern when there is a certain similarity between the channel list pattern and a stored noise source channel pattern.

The logical transmission channels are rated by the radio input/output modules of the automation device preferably using the spectral noise powers in the respective frequency band for which the radio input/output modules are set up. If a radio input/output module performs radio data communication based on the Bluetooth standard, for example, the spectral noise powers are rated in the 2.45 GHz ISM frequency band. The individual channels in the frequency band are then flagged as a noise-free or noisy channel by means of bit encoding, and this bit encoding of the channels in a frequency band is then transmitted as a channel pattern to a noise source identification unit which is connected by means of a radio input/output module. The noise source identification unit then evaluates the at least one channel pattern, preferably a multiplicity of channel patterns from a plurality of radio input/output modules which are present in the automation device.

The type of a noise source can be identified using the profile of the noisy channels. The characteristic profile of the spectrum of a noise source may be flagged by noise powers for particular, non-adjacent frequency bands, for example.

It is also possible for the type of a noise source to be identified using the frequency bandwidth of a sequence of adjacent continuously noisy channels. Thus, by way of example, continuously noisy frequency ranges with a width of 3 MHz allow an IEEE 802.15.4 O-QPSK-based radio system to be inferred. By contrast, a WLAN radio system based on IEEE 802.11 B/G emits interference which affects a spectrum approximately 20 MHz wide.

On the other hand, microwave systems may be able to be characterized by two spectral signal components a bandwidth of approximately 10 MHz in each case. They therefore have a characteristic spectral profile.

It is also an object of the present invention to provide an improved noise source identification unit which can be used to identify noise sources in an automation device inexpensively and easily. These are identified using the noise source identification unit of the type cited at the outset by virtue of the data communication unit also being set up to read channel patterns which are currently stored in channel lists of connected radio input/output modules and which flag the availability of transmission channels for radio data transmission, and by virtue of the comparison unit being set up to compare the availability of the sequence of channels with a number of noise source channel patterns stored for a number of different noise sources and to identify a noise source if the channel pattern defined by the availability of the sequence of channels has a prescribed minimum similarity with one of the stored noise source channel patterns.

Advantageous embodiments are described in the subclaims.

The invention is explained in more detail below using an exemplary embodiment with reference to the appended drawings, in which.

Figure 1:
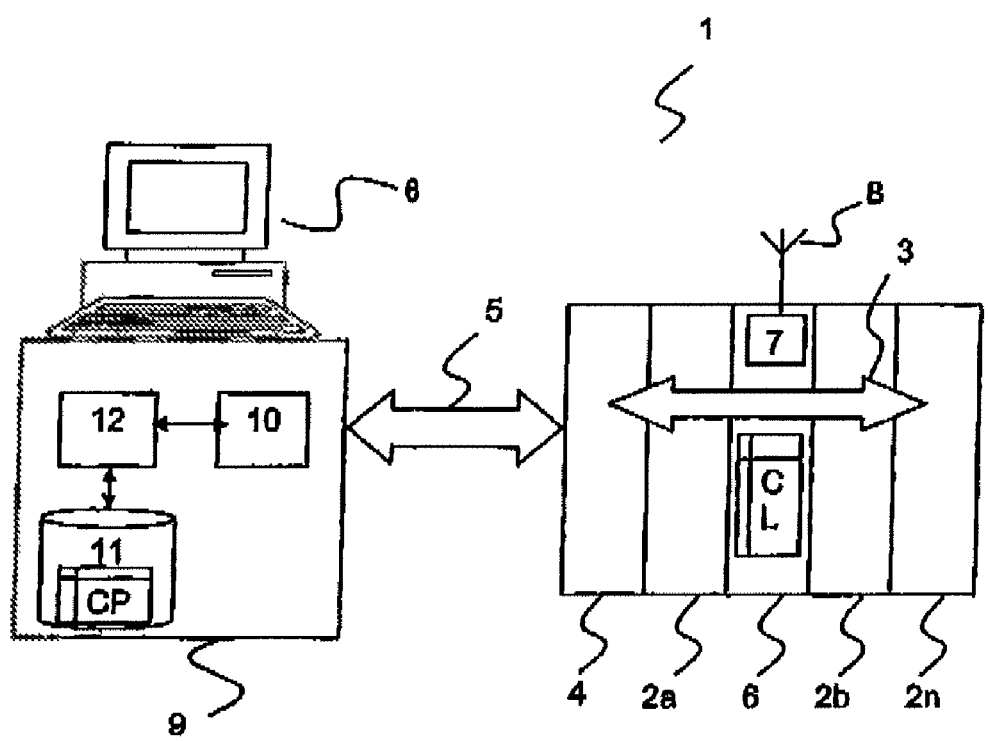
FIG. 1 shows a block diagram of a noise source identification unit in an automation device.

FIG. 1 shows an automation device 1 which has, in a manner which is known per se, a multiplicity of input/output modules 2a, 2b, ... 2n which are networked to one another by means of a data bus 3. The sequence of input/output modules 2a, 2b, ... 2n can be connected to a field bus 5 by means of a field bus coupler 4 in order to connect them to a superordinate control unit 6.

In this way, the automation device 1 may have, by way of example, one, two, three or more combinations of field bus coupler 4 and input/output modules 2. Such a sequence of field bus coupler 4 and input/output modules 2a, 2b, ... 2n is placed adjacently onto a top-hat rail, for example.

In this arrangement, a selection of input/output modules 2a, 2b, ... , 2n may be designed for radio data communication and may form a respective specific radio input/output module 6 which uses a transmission/reception unit 7 and an antenna 8 to communicate with other subscribers in the automation device 1 by radio.

The automation device 1 also has a noise source identification unit 9 which may be integrated in the central control unit 6 or else may be a separate noise source identification module which can be connected to the data bus 3 or the field bus 5. Alternatively, the noise source identification unit 9 can be integrated into the field bus coupler 4 or into an input/output module 2a, 2b, ... 2n or a radio input/output module 6.

The noise source identification unit 9 has a data bus communication unit 10 with an interface and an interface controller for data communication with radio input/output modules 6 of the automation device 1 via the data bus 3, 5. In addition, the noise source identification unit 9 has a data store 11 which stores characteristic noise source channel patterns for known noise sources. A comparison unit 12 in a noise source identification unit 9 accesses the data store 11 and the data bus communication unit 10 in order to read and compare firstly the stored noise source channel patterns from the data store 11 and secondly channel lists CL of connected radio input/output modules 6. The channel lists CL which are read from the radio input/output modules 6 contain information about the availability of a sequence of transmission channels in a frequency band. In this case, the individual channels in the frequency band are flagged as a noise-free or noisy channel by means of bit encoding.

A comparison of the pattern formed by the bit encoding of one of the read channel lists CL with stored noise source channel patterns is used by the comparison unit 12 to infer the presence of noise sources and the type thereof in the surroundings of the automation device without the need for additional measurement complexity and additional hardware.

Instead, the information which is available in the radio input/output modules 6 anyway about the availability of channels is used. The fact that the bit encoding from the sequence of channels in a frequency band assumes characteristic patterns for particular noise sources is used to identify the presence and the type of noise sources.

Figure 2:
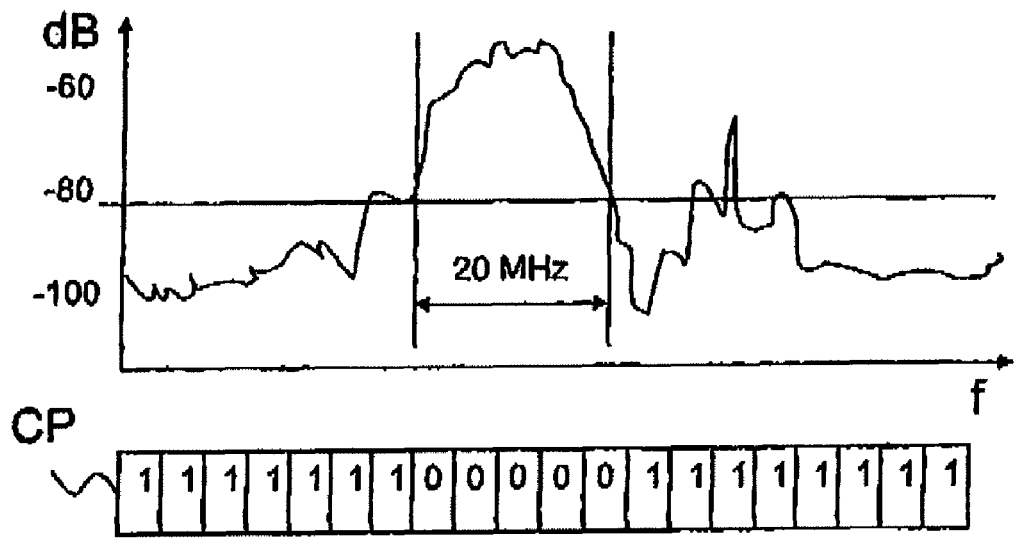
FIG. 2 shows a characteristic spectrum and bit pattern for a WLAN noise source.

FIG. 2 shows an outline of a graph of the spectrum of a characteristic spectrum for a WLAN radio system based on IEEE 802.11 b/g. Such a WLAN radio signal in the 2.4 GHz ISM frequency band exhibits a frequency band range with a bandwidth of approximately 20 MHz. The associated channel list CL or noise source channel pattern CP contains a bit pattern in which every channel is binary-encoded. One of the values "0" signals an unused channel, i.e. the channel is subject to currently active interfering influences and has been hidden for communication. By contrast, "1" indicates that the channel is noise-free.

In such a WLAN radio system, approximately 20 successive bit positions are characteristically occupied by the value "0". This characteristic noise source channel pattern CP can now be used to identify the presence of a WLAN radio system in the surroundings of an automation device in comparison with a bit string which is read by a radio input/output module 6.

Figure 3:
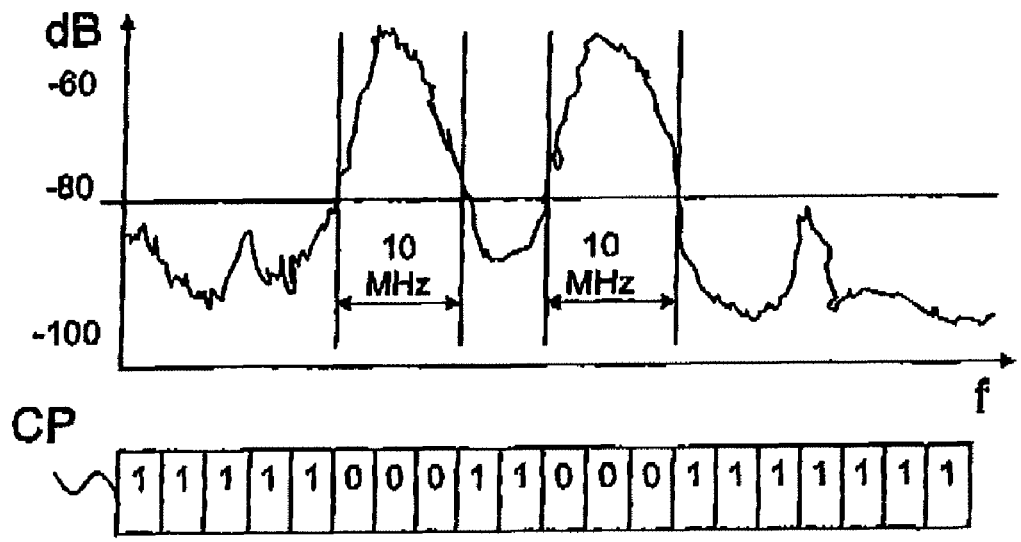
FIG. 3 shows a spectrum and bit pattern for a microwave noise source.

FIG. 3 shows a graph and a noise source channel pattern CP which is characteristic of microwave systems. Typically, microwave systems have a spectrum, wherein the centre frequency of 2.45 GHz can be characterized by two spectral signal components on a bandwidth of 10 MHz in each case. It is conceivable for other noise sources to imitate microwave emissions with other characteristic signal profiles.

It can be seen in the example spectrum of a microwave emission that the signal level has a significantly higher signal level in two non-adjacent frequency bands in a bandwidth of approximately 10 MHz.

Figure 4:
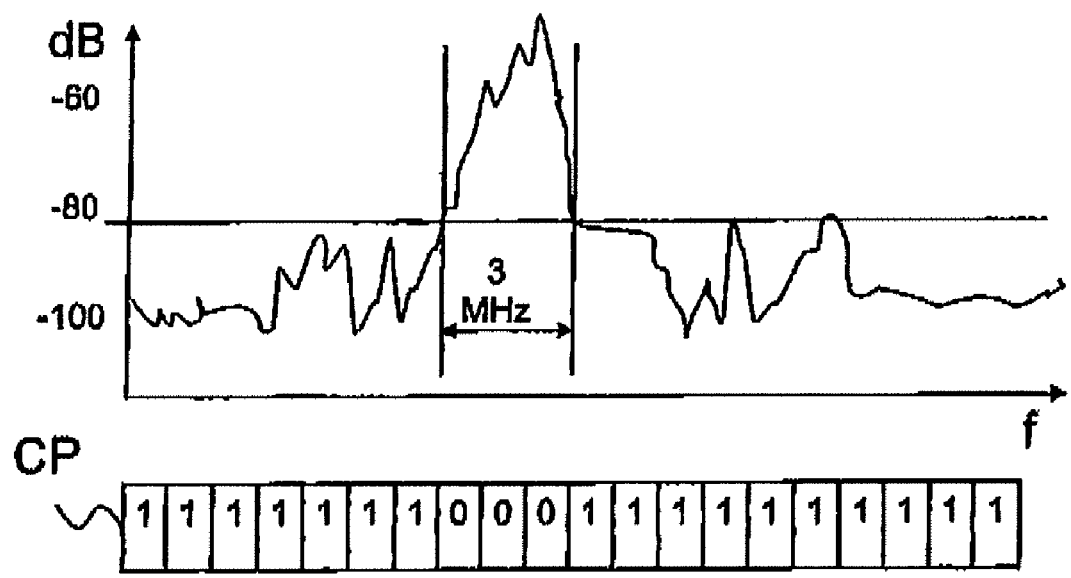
FIG. 4 shows a spectrum and frequency pattern for an O-QPSK noise source.

FIG. 4 shows the outline of a graph of a spectrum for an IEEE 802.15.4 O-QPSK signal in the 2.4 GHz ISM frequency range and also an associated noise source channel pattern CP. It can be seen that the signal has a signal level of more than approximately 65 dB a bandwidth of approximately 3 MHz.

Accordingly, characteristic spectra for the signal emitted by the noise source and for associated binary noise source channel patterns CP can be sensed for a multiplicity of noise sources and can be used for comparison with the bit encoding of the read channel lists CL.

The invention claimed is:

1. Method for identifying noise sources for automation devices which have a multiplicity of input/output modules which are coupled to one another by means of a data bus and at least one of which is set up as a radio input/output module for radio data communication, comprising the steps of:
   repeatedly checking availability of transmission channels for radio data transmission with said at least one radio input/output module;
   storing the availability of a sequence of transmission channels in a channel list (CL);
   reading the availability of a sequence of transmission channels currently stored in the CL of the at least one radio input/output module;
   comparing the availability of the sequence of transmission channels with a number of noise source type channel patterns (CP) which are stored and each of which correspond to one of a number of different noise sources, and identifying a noise source based on a prescribed minimum similarity of said sequence of transmission channels stored in the CL with one of the stored CP.

2. Method according to claim 1, wherein a type of a noise source is ascertained from known noise source types which are associated with the stored noise source CP.

3. Method according to claim 1, further comprising:
   rating logical transmission channels by the at least one input/output module set up as a radio input/output module using spectral noise powers in a respective frequency band for which the at least one input/output module set up as a radio input/output module is set up;
   flagging individual channels in the respective frequency band as a noise-free or noisy channel by means of bit encoding, wherein a channel pattern defined by the bit encoding for channels in a frequency band are transmitted for of comparison with a stored noise source channel pattern on a noise source identification unit which is connected to the input/output modules by means of the data bus.

4. Method according to claim 1, wherein a type of a noise source is identified using a profile of noisy channels.

5. Method according to claim 1, wherein a type of a noise source is identified using a frequency bandwidth of a sequence of adjacent continuously noisy channels.

6. Noise source identification unit, comprising:
   a comparison unit;
   a data store;
   a data bus communication unit set up for data communication with radio input/output modules of an automation device by means of a data bus,
   wherein the data bus communication unit is set up to read channel patterns which are currently stored in channel lists (CL) of one or more connected radio input/output modules, and
   wherein one or more of the data bus communication unit and the comparison unit is configured to flag the availability of transmission channels for radio data transmission, and
   wherein the comparison unit is set up to compare the availability of the sequence of channels with a number of noise source type channel patterns (CP) stored for a number of different noise sources each of said CP correponding to one of a number of different noise sources, and to identify a noise source if the channel pattern defined by the availability of the sequence of channels has a prescribed minimum similarity with one of the stored CP.

7. Noise source identification unit according to claim 6, wherein the comparison unit is set up to ascertain a type of a noise source from known noise source types which are associated with the stored noise source CP.

8. Noise source identification unit according to claim 6, wherein the comparison unit is set up to compare bit-encoded channel patterns, wherein individual channels in a frequency band have been flagged as a noise-free or noisy channel by means of bit encoding and wherein noise on a channel has been determined by spectral noise power in the frequency band.

9. Noise source identification unit according to claim 6, wherein the comparison unit is set up to identify a type of a noise source using spectral profiles of noisy channels.

10. Noise source identification unit according to claims 6, wherein the comparison unit is set up to identify a type of a noise source using a frequency bandwidth of a sequence of adjoining continuously noisy channels.

* * * * *